United States Patent
Stumpf et al.

(10) Patent No.: US 11,573,905 B2
(45) Date of Patent: Feb. 7, 2023

(54) SAVING PAGE RETIRE INFORMATION PERSISTENTLY ACROSS OPERATING SYSTEM REBOOTS

(71) Applicant: VMware, Inc., Palo Alto, CA (US)

(72) Inventors: Tobias Stumpf, Munich (DE); Ashish Kaila, Palo Alto, CA (US); Mukund Gunti, Mountain View, CA (US); Rajesh Venkatasubramanian, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 10 days.

(21) Appl. No.: 17/154,411

(22) Filed: Jan. 21, 2021

(65) Prior Publication Data

US 2022/0229781 A1    Jul. 21, 2022

(51) Int. Cl.
| | | |
|---|---|---|
| *G06F 12/1009* | (2016.01) | |
| *G06F 12/1027* | (2016.01) | |
| *G06F 11/14* | (2006.01) | |
| *G06F 12/0875* | (2016.01) | |
| *G06F 9/4401* | (2018.01) | |
| *G06F 9/445* | (2018.01) | |

(52) U.S. Cl.
CPC ...... *G06F 12/1009* (2013.01); *G06F 11/1417* (2013.01); *G06F 11/1438* (2013.01); *G06F 12/0875* (2013.01); *G06F 12/1027* (2013.01); *G06F 9/4401* (2013.01); *G06F 9/4406* (2013.01); *G06F 9/44505* (2013.01)

(58) Field of Classification Search
CPC .. G06F 9/4401; G06F 9/4406; G06F 9/44505; G06F 11/1417; G06F 11/0793; G06F 11/1666; G06F 11/20; G06F 11/073

USPC .................. 713/1, 2, 100; 714/6.1, 6.13, 42
See application file for complete search history.

(56) References Cited

U.S. PATENT DOCUMENTS

| | | | | |
|---|---|---|---|---|
| 6,463,550 B1 * | 10/2002 | Cepulis | ................. | G06F 11/006 714/25 |
| 7,308,603 B2 * | 12/2007 | Carver | ................ | G06F 11/1008 714/6.13 |
| 7,890,819 B2 * | 2/2011 | Charlton | .................. | G11C 5/04 365/201 |
| 2015/0143054 A1 * | 5/2015 | Ackaret | ............... | G06F 11/0754 711/133 |
| 2015/0293822 A1 * | 10/2015 | Chun | .................. | G06F 11/2017 714/6.13 |

(Continued)

*Primary Examiner* — Ji H Bae
(74) *Attorney, Agent, or Firm* — Clayton, McKay & Bailey, PC

(57) ABSTRACT

Examples described herein include systems and methods for retaining information about bad memory pages across an operating system reboot. An example method includes detecting, by a first instance of an operating system, an error in a memory page of a non-transitory storage medium of a computing device executing the operating system. The operating system can tag the memory page as a bad memory page, indicating that the memory page should not be used by the operating system. The operating system can also store tag information indicating memory pages of the storage medium that are tagged as bad memory pages. The example method can also include receiving an instruction to reboot the operating system, booting a second instance of the operating system, and providing the tag information to the second instance of the operating system. The operating system can use the tag information to avoid using the bad memory pages.

20 Claims, 6 Drawing Sheets

(56) References Cited

U.S. PATENT DOCUMENTS

2017/0230179 A1\* 8/2017 Mannan ................ H04L 9/3226
2020/0004652 A1\* 1/2020 Niu ..................... G11C 29/4401
2021/0406143 A1\* 12/2021 Chaiken .............. G06F 11/0763

\* cited by examiner

SAVING PAGE RETIRE INFORMATION PERSISTENTLY ACROSS OPERATING SYSTEM REBOOTS

BACKGROUND

Over the lifetime of a computing system, memory chips or disks can wear out. Most operating systems keep track of bad memory regions to avoid data corruptions and general system instability. This information gets lost during a system reboot, which increases the vulnerability of the machine after a reboot.

During runtime an operating system keeps track of pages that the memory controller or the system firmware, such as the Basic Input/Output System ("BIOS") or Unified Extensible Firmware Interface ("UEFI"), reports as having errors. These pages are considered retired by the operating system because they are not allowed to be allocated to applications, the operating system kernel, or virtual machines running on the operating system. This page retire information is lost when the operating system reboots, so it is only temporarily available.

Memory errors can be classified as correctable errors, which can be fixed via error-correcting code ("ECC"), or uncorrectable errors in which case the contents in memory have been compromised and consuming content from that part of memory can compromise the integrity of the operating system kernel, application, or virtual machine consuming that portion of memory.

For correctable errors, typically most operating systems use some form of heuristics to determine when to retire a page—for instance, several thousand correctable errors in a region of memory in quick succession can be a cause of concern and the operating system may retire that portion of memory. This prevents the system from encountering uncorrectable memory errors in that portion of memory later on. For uncorrectable errors, the operating system reacts far more aggressively by either crashing the application, virtual machine, or the operating system itself. After terminating the affected service, the page is retired immediately to avoid further impact.

Page retirement information is crucial for the reliability of an enterprise class cloud operating system; however, this information is available only transiently and only during the uptime of the operating system. When an operating system is rebooted, this information is lost and the operating system needs to rely on the system firmware to either scrub bad memory during system boot or recreate its view of bad memory during its runtime, leading to a decrease in the reliability of the operating system.

Not being able to keep this information across reboots has many drawbacks. For example, even if some hardware or firmware performs memory checks after powering on the machine, not all memory failures can be detected. For instance, data corruption may only occur after the memory region has not been accessed for a while or may depend on the memory access pattern by workloads running on the operating system or the operating system itself. During a hardware or firmware scan it is not possible to use heuristics like the operating system does to detected bad memory regions. As a result, the firmware may not be able to identify the right pages of memory to retire or hide from the operating system. Additionally, checking all memory pages is very time intensive and becomes prohibitive as memory sizes increase.

Additionally, modern hypervisors provide mechanisms to skip the hardware initialization during a system soft reboot to reduce the time it takes to reboot the machine. As a result, no memory checks are performed at all in those circumstances.

As a result, a need exists for retaining information about bad memory pages across an OS reboot, regardless of the type of reboot.

SUMMARY

Examples described herein include systems and methods for retaining information about bad memory pages across an operating system reboot. An example method includes detecting, by a first instance of an operating system, an error in a memory page of a non-transitory storage medium of a computing device executing the operating system. In some examples, the error can be of the correctable or uncorrectable variety. The method can further include tagging the memory page as a bad memory page, indicating that the memory page should not be used by the operating system.

In an example where the computing device is a server, the "instances" of the operating system can refer to instances of the operating system executing at the server level, typically one at a time, as opposed to instances of operating systems associated with virtual machines executing on the server.

The method can further include storing tag information indicating memory pages of the storage medium that are tagged as bad memory pages. For example, the operating system can store a memory map that tracks various types of memory information, such as which memory is used or free as well as which memory pages are tagged as bad and should not be used. Storing can comprise extracting the information about the bad memory pages from the memory map. This tag information can be stored as a list, a page table, or a bit map for example.

The example method can also include receiving an instruction to reboot the operating system, booting a second instance of the operating system, and providing the tag information to the second instance of the operating system. The second instance of the operating system can then use the tag information to avoid using those memory pages that have been tagged as bad memory.

The example method can apply to either a soft reboot that does not include a full system, power-control reboot, or a hard reboot that includes a power cycle. As used herein, a soft reboot refers to a reboot mechanism that skips or avoids firmware and hardware initialization and memory checks, while a hard reboot refers to a reboot mechanism that includes firmware and hardware initialization.

In the example of a soft reboot, the method can further include passing the tag information from the first instance of the operating system to the second instance of the operating system. In the example of a hard reboot, providing the tag information can including persistently storing, by the first instance of the operating system, the tag information on the computing device. The tag information can be serialized in order to store it more efficiently in the persistent storage location. Providing the tag information can also include retrieving, by the second instance of the operating system, the tag information from the storage location.

The second instance of the operating system can retrieve the tag information through a firmware interface, for example. The method can include modifying a boot loader to retrieve the tag information and provide it to the operating system. Regardless of how the second instance of the operating system receives the tag information, the example method can also include instructing the second instance of the operating system to avoid using any memory pages indicated as bad by the tag information.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

During runtime, an operating system can use a memory map to keep track of various types of information relating to the memory of a computing device that is executing the operating system. The memory map can include information such as which memory pages are free or used, as well as which memory pages are retired or otherwise include errors. The operating system can use the memory map to determine which memory pages to use or avoid. However, the information in the memory map is typically lost when the operating system reboots. While there are methods to repopulate a new memory map with memory information, the information is typically incomplete in comparison to the previous memory map discarded upon reboot. The various systems and methods herein solve this technological problem by providing a mechanism for retaining relevant information from the memory map across either a soft or hard reboot of the computing device.

Figure 1:
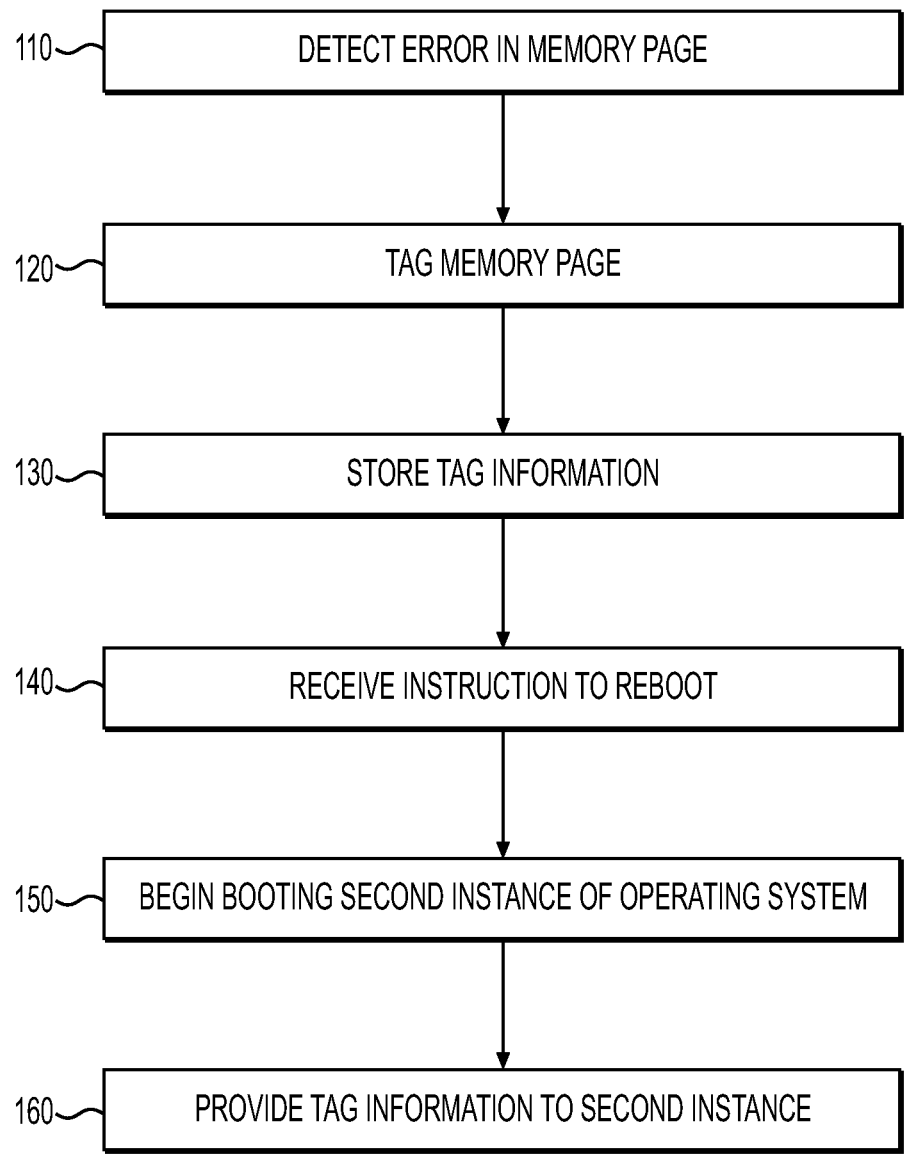
FIG. 1 is a flowchart of an example method for retaining information about bad memory pages across an operating system reboot.

FIG. 1 provides a flowchart of an example method for retaining information about bad memory pages across an OS reboot. At stage 110, a first instance of an operating system can detect an error in a memory page. The operating system can execute on a computing device to perform this stage. For example, it can execute on a server, computer, phone, tablet, or any other device with a hardware-based processor and memory storage. As part of this stage, the operating system can identify a memory error in a memory page, including either a correctable error or an uncorrectable error. The operating system can detect errors based on memory access patterns or particular workloads experienced by the computing device.

At stage 120, the operating system can tag each memory page, or ranges of memory pages, for which errors were detected at stage 110. In some examples, the tag is a new tag programmed into the operating system for the purpose of carrying out the methods described herein. Applying the tag can be performed by inputting the relevant memory page into the memory map. In some examples, applying the tag is performed by not only listing the memory page in the memory map, but also including additional information about the relevant memory page in the memory map. This can include a header, an alphanumeric code, or an additional entry in the memory map (such as a separate column in a table that corresponds to the tag). In some examples, the operating system is instructed or modified such that it recognizes the tag and avoids using any memory page tagged in this manner.

At stage 130, the operating system can store the tag information. As mentioned previously, a memory map is typically discarded when an operating system shuts down, leaving the next instance of the operating system to recreate the memory map from scratch—a process with various drawbacks. Stage 130 can therefore include storing the tag information generated at stage 120. This can be performed in various ways, such as by generating a list of tagged memory pages, generating a page table of the tagged memory pages, or using a bit map of tagged memory pages where one bit indicates if a page is tagged or not. In yet another example, the memory map itself can be stored and at least partially reused by the next instance of the operating system that takes over after reboot.

Stage 140 can include the operating system receiving an instruction to reboot the device. The instruction can be, for example, a user electing to shut down or restart the device. In another example, the instruction is generated by the operating system in response to, for example, encountering an error or installing an update. In response to this instruction, at stage 150 the device can begin booting a second instance of the operating system.

Before the second instance of the operating system is fully loaded, stage 160 can commence, including providing the tag information to the second instance of the operating system. Providing this information can allow the second instance of the operating system to avoid using the bad memory pages, either for the operating system itself or for other operations performed by the computing device. The tags information can be provided to the second instance of the operating system in various manners, as described in more detail herein.

Figure 2:
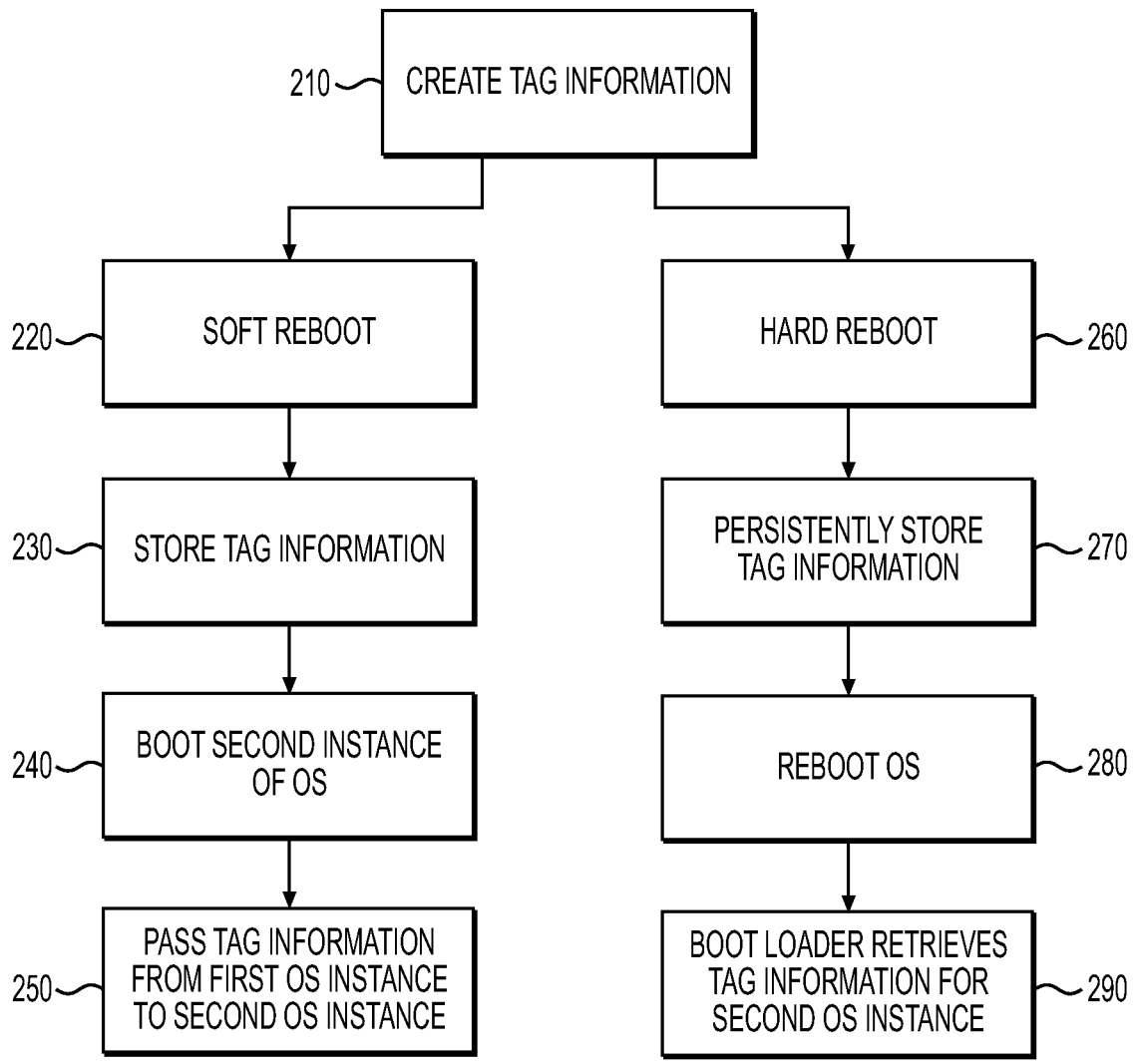
FIG. 2 is another flowchart of an example method for retaining information about bad memory pages across an operating system reboot based on the type of reboot.

FIG. 2 provides a flowchart of an example method for retaining information about bad memory pages across an OS reboot based on the type of reboot. Stage 210 can include creating the tag information, such as what is described above with respect to stage 120 of FIG. 1. If the reboot operation is a soft reboot, the method can continue to stage 220 where the soft reboot is initiated. At stage 230, the operating system can store the tag information. This can be performed in various ways, such as by generating a list of tagged memory pages, generating a page table of the tagged memory pages, or using a bit map of tagged memory pages where one bit indicates if a page is tagged or not.

At stage 240, the first instance of the operating system can boot a second instance of the operating system. In some examples, the first instance can act as a bootloader for the second instance. At stage 250, the first instance can pass the tag information to the second instance of the operating system. This can be performed in a variety of ways, such as by creating a new boot module that is loaded by the first instance of the operating system (or like in the example of a hard reboot, by the boot loader). The second instance of the operating system could access the new boot module during the boot process.

In another example, the tag information can be provided to the second instance of the operating system by using an Application Programming Interface ("API") to communicate between the two operating system instances. This can be accomplished in several ways. In one example, the boot protocol of the operating system can be extended. Generally speaking, a boot protocol is an API that describes where the boot modules are loaded and how the operating system can access that information. By extending this data structure, additional information regarding the tagged bad memory pages can be transferred between operating systems. For example, the boot protocol can be an open-ended list with each entry having a type and size entry followed by specific information. Each specific tagged memory page can be added to this list in an example. A portion of the pseudocode for performing this addition is shown below:

```
enum Type {
    Bootmodule;
    MemoryInformation,
    RetirePage_Opt1
```

The boot protocol can include a list with variable size elements. To identify each element, the code can include type and size information. In the example above, the type is an enum, which is a string representation for an integer. Bootmodule and MemoryInformation are other examples of information within the boot API. Additional pseudocode for performing the addition is provided below:

```
struct RetirePage_Opt1 {
    Type t;
    size_t size;
    unsigned int numRetiredPages;
    MPN RetiredPages[ ];
}
```

RetirePage_Opt1 is an example for one implementation. Type t can be a positive integer in the form of RetirePage, size_t, and the size value can describe the size consumed by RetirePage_Opt1. The size can depend on the amount of stored information. Additionally, nmRetiredPages is an unsigned integer and its value is equal or greater than zero. RetiredPages can be an array with machine pages numbers ("MPNs") each describing a retired page. The size of the data structure is computed by the size of the fixed elements (e.g., type, size, numRetiredPages) plus the variable size element retiredPages. The variable size depends on the numRetirePages multiplied by the size needed to store the address of one machine page numbers.

In another example, one or more ranges of memory pages can be added to the list. Pseudocode for performing this addition is shown below:

```
struct RetirePage_Opt2 {
    Type t;
    size_t size;
    MPN retiredPage;
    unsigned int numPagesToRetired;
}
```

In this example, RetirePage_Opt2 is of fixed size. "t" and "size" have the same meaning as in the previous example, while the calculation of size depends on the size required to store t, size, retirePage, and numPagesToRetired. retiredPage can be the MPN for a retired page. numPagesToRetired can be equal or greater than 1 and describe how many contiguous pages are retired. For example, if retiredPage equals 100 and numPagesToRetired equals 4, then in that example pages 100, 101, 102, and 103 are marked as retired or "bad." For each block of retired pages, the list with boot information can be extended by a RetirePage_Opt2 entry.

In yet another example, one or more ranges of memory pages can be identified through a pointer to another memory entry, as shown in the example pseudocode below:

```
struct RetirePage_Opt3 {
    Type t;
    size_t size; //
    void *mapWithRetiredPages;
}
```

In the example above, the maning oft and size is the same as previously described. mapWithRetiredPages can be a pointer to another memory data structure that is not part of the list of boot information. The design can depend on the protocol used by the two operating system instances. In an example implementation, the map can be "n" bits large, where "n" represents the number of machine pages for a given computing device. A value of 1 can indicate a retired or "bad" page, while a value of 0 can indicate that the page can be used.

In addition to expanding the boot protocol of the operating system as explained above, the information can alternatively be passed from one operating system instance to the next by using a new interface between the two instances. In that example, the old kernel of the first instance of the operating system can prepare the information for the new instance, and the new instance can be programmed to utilize the information accordingly. In such an example, a custom API can be built into the operating system to allow for this transfer of information.

In any of the examples described, when the second instance of the operating system is loaded, the old instance can provide a pointer to the data structures of interest. The pointer can be shared in a memory register, in memory relative to the stack pointer, or on some other memory address known by both operating system instances. This pointer is sufficient for the new instance to find the metadata and from there derive all required information to retrieve the information about bad memory pages. In another example, rather than using pointers, a callback function can be used by the second operating system instance to call into the first (still running) operating system and request the relevant information.

In yet another example, the first instance of the operating system can pass the old memory map to the second instance of the operating system that is being booted. The second instance can remove any unnecessary portions of the old memory map, such as any information not relevant to memory pages tagged as bad. The second instance would then be left with a memory map showing all memory pages tagged as bad, which then can be avoided.

While stages 220-250 describe stages of a soft reboot, stages 260-290 describe stages of a hard reboot. The hard reboot can begin at stage 260. At stage 270, the first instance of the operating system can persistently store the tag information. This can be performed in various ways, such as by generating a list of tagged memory pages, generating a page table of the tagged memory pages, or using a bit map of tagged memory pages where 1 bit indicates if a page is tagged or not.

Regardless of the format of the tag information, it can be stored in a persistent storage location that is accessible to a bootloader of a new instance of the operating system. The persistent storage location can be accessible before initialization of the full operating system; otherwise, the operating system itself may utilize bad memory pages before becoming aware of the bad memory pages. In one example, the persistent storage location is a boot bank with boot modules. In another example, the persistent storage location is an initramfs. The boot loader of the operating system can load the boot module or initramfs such that the data is available at the time of initializing the memory subsystem.

At stage 280, the first instance of the operating system can be shut down and the second instance of the operating system can be booted. At stage 290, the boot loader can retrieve the tag information from the persistent storage location and initialize the memory subsystem in a manner that avoids using the memory pages tagged as bad. Once up and running, the second instance of the operating system can retain the tag information, such as by transferring it to a memory map for that operating system instance.

Figure 3:
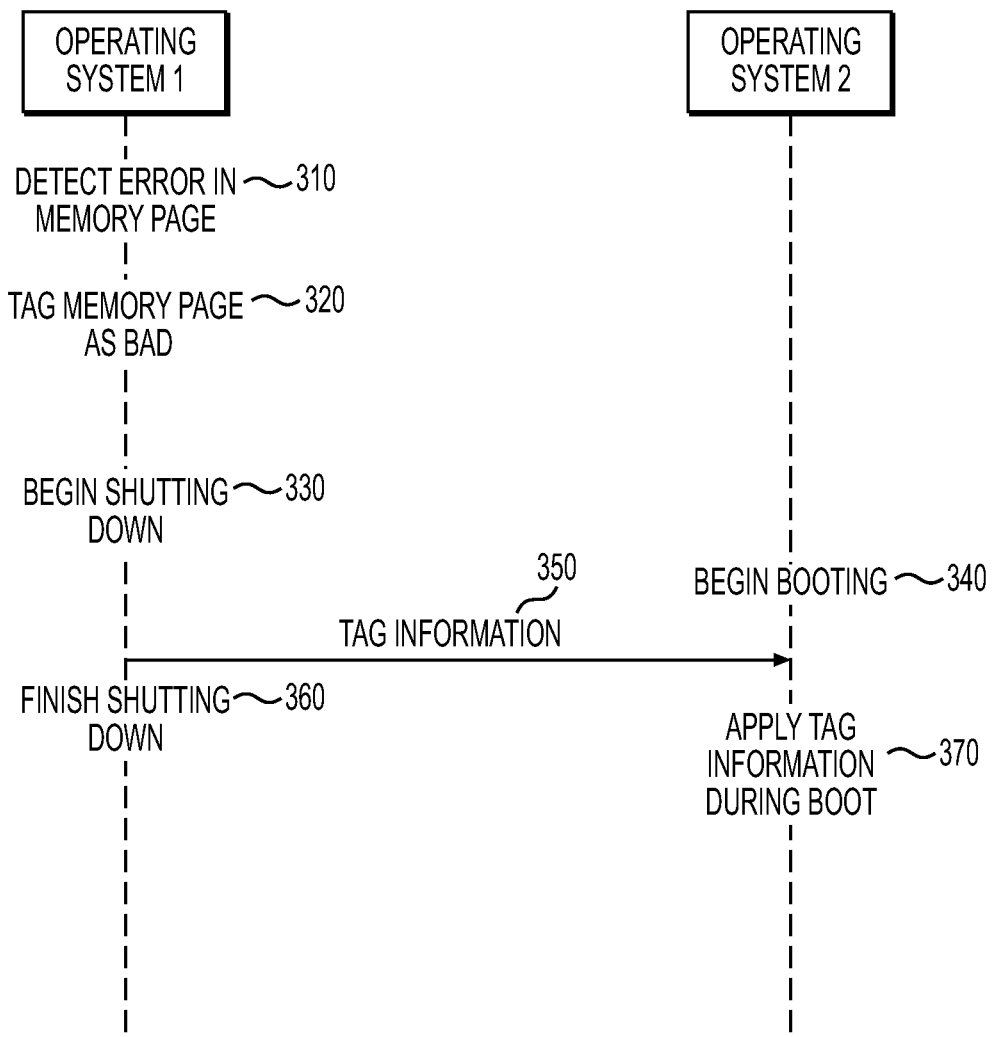
FIG. 3 is a sequence diagram of an example method for retaining information about bad memory pages across a soft reboot of an operating system.

FIG. 3 provides a sequence diagram of an example method for retaining information about bad memory pages across a soft reboot of an operating system. At stage 310, the first instance of an operating system (currently executing on a computing device) can detect an error in a memory page. As part of this stage, the operating system can identify a memory error in a memory page, including either a correctable error or an uncorrectable error.

The operating system can detect errors based on memory access patterns or particular workloads experienced by the computing device. For example, data corruption may only occur after the memory region has not been accessed for a period of time or may depend on the memory access pattern by workloads running on the operating system or the operating system itself. In an example, several thousand correctable errors in a region of memory in quick succession can cause the operating system to detect an error in that region of memory. Errors can also be detected when the operating system is forced to crash an application, virtual machine, or the operating system itself.

At stage 320, the first instance of the operating system can tag one or more memory pages as bad, based on detecting an error on that memory page at stage 310. In some examples, the tag is a new tag programmed into the operating system for the purpose of carrying out the methods described herein. Applying the tag can be performed by inputting the relevant memory page into the memory map. In some examples, applying the tag is performed by not only listing the memory page in the memory map, but also including additional information about the relevant memory page in the memory map. This can include a header, an alphanumeric code, or an additional entry in the memory map (such as a separate column in a table that corresponds to the tag). In some examples, the operating system is instructed or modified such that it recognizes the tag and avoids using any memory page tagged in this manner.

At stage 330, the first instance of the operating system begins shutting down. This stage can be performed in response to an instruction to shut down, such as a user selecting an option to restart the machine or based on the operating system determining that a restart is needed to handle errors, load updates, or to accomplish some other goal. As part of stage 330, the first instance of the operating system can act as a boot loader for a second instance of the operating system. As explained above, the boot protocol for the first operating system instance can be extended to include an API describing where the tag information is stored and how the second instance of the operating system can access that information. The boot-loader portion of the first operating system instance can begin booting the second operating system instance at stage 340, for example.

At stage 350, the second instance can retrieve the stored tag information from the first instance of the operating system. This can be performed in a variety of ways, such as by creating a new boot module that is loaded by the first instance of the operating system and accessed by the second instance of the operating system during the boot process. In another example, the tag information can be provided to the second instance of the operating system by using an API to communicate between the two operating system instances.

This can be accomplished in several ways. In one example, the boot protocol of the operating system can be extended. The boot protocol can be an API that describes where the boot modules are loaded and how the operating system can access that information. By extending this data structure, additional information regarding the tagged bad memory pages can be transferred between operating systems. For example, the boot protocol can be an open-ended list with each entry having a type and size entry followed by specific information. Each specific tagged memory page can be added to this list in an example, as shown in the pseudocode with respect to FIG. 2. In another example, one or more ranges of memory pages can be added to the list. In yet another example, one or more ranges of memory pages can be identified through a pointer to another memory entry.

In addition to expanding the boot protocol of the operating system as explained above, the information can alternatively be passed from one operating system instance to the next by using a new interface between the two instances. In that example, the old kernel of the first instance of the operating system can prepare the information for the new instance, and the new instance can be programmed to utilize the information accordingly. In such an example, a custom API can be built into the operating system to allow for this transfer of information.

In any of the examples described, when the second instance of the operating system is loaded, the old instance can provide a pointer to the data structures of interest. The pointer can be shared in a memory register, in memory relative to the stack pointer, or on some other memory address known by both operating system instances. This pointer is sufficient for the new instance to find the metadata and from there derive all required information to retrieve the information about bad memory pages. In another example, rather than using pointers, a callback function can be used by the second operating system instance to call into the first (still running) operating system and request the relevant information.

In yet another example, the first instance of the operating system can pass the old memory map to the second instance of the operating system that is being booted. The second instance can remove any unnecessary portions of the old memory map, such as any information not relevant to memory pages tagged as bad. The second instance would then be left with a memory map showing all memory pages tagged as bad, which then can be avoided.

At stage 360, the first instance of the operating system can complete its shut down procedure and be terminated. The second instance of the operating system can apply the tag information as it completes the boot process at stage 370. Because the second instance of the operating system received the tag information before completing the boot process, it can load the operating system using only memory pages that have not been tagged as bad by the previous operating system instance. This can provide additional stability to the operating system at a time when it otherwise might not be able to identify memory errors. Once the second instance is up and running, it can continue using the tag information and avoid using bad memory pages to support applications or virtual machines. It can also update the tag information as more bad memory pages are identified or as previously tagged memory pages are corrected.

Figure 4:
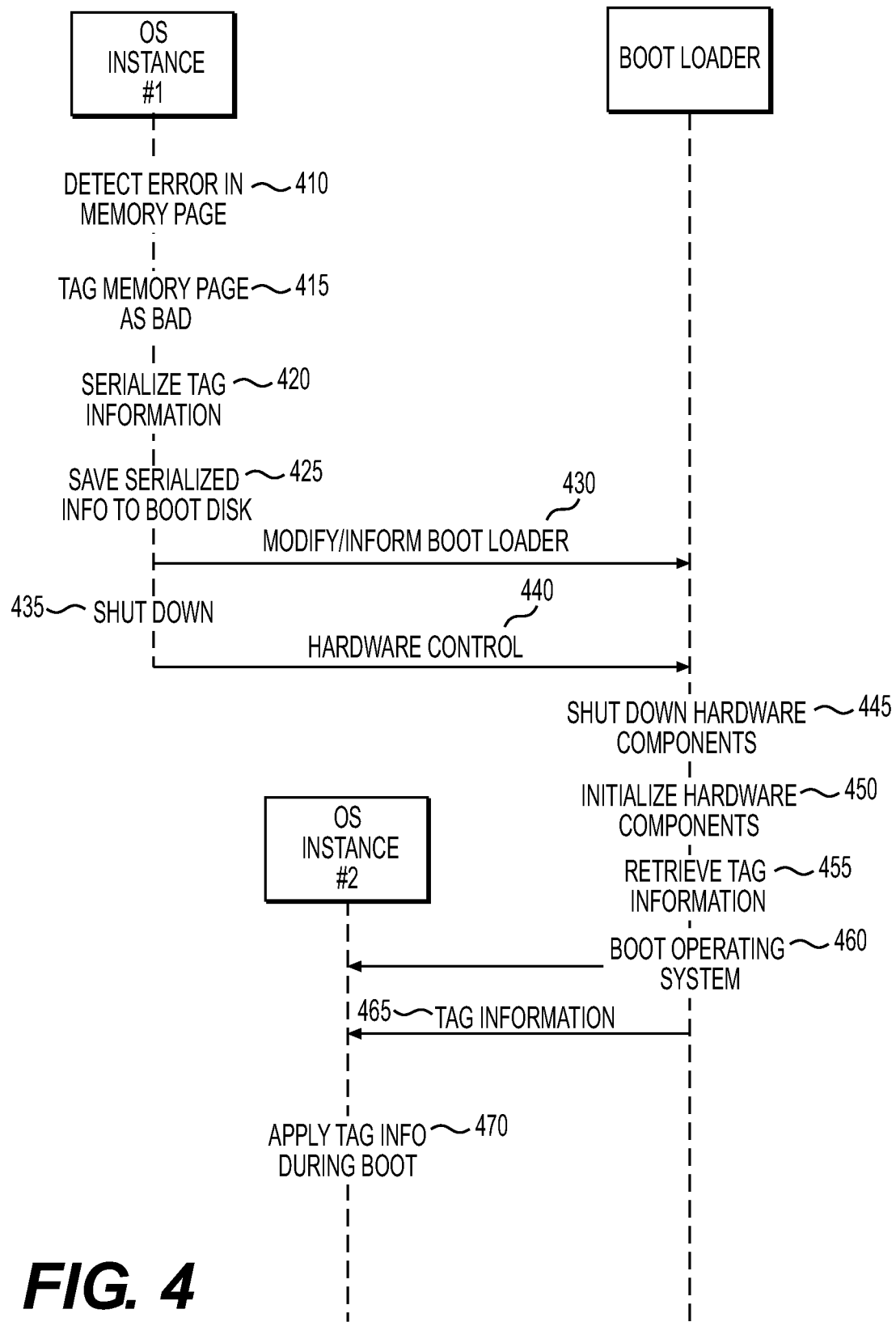
FIG. 4 is a sequence diagram of an example method for retaining information about bad memory pages across a hard reboot of an operating system.

FIG. 4 provides a sequence diagram of an example method for retaining information about bad memory pages across a hard reboot of an operating system. Stages 410 and 415 of FIG. 4 can be substantially similar to stages 310 and 320 of FIG. 3. That is, at stage 410 the first instance of an operating system (currently executing on a computing device) can detect an error in a memory page. As part of this stage, the operating system can identify a memory error in a memory page, including either a correctable error or an uncorrectable error.

At stage 415, the first instance of the operating system can tag one or more memory pages as bad, based on detecting an error on that memory page at stage 410. In some examples, the tag is a new tag programmed into the operating system. Applying the tag can be performed by inputting the relevant memory page into the memory map. In some examples, applying the tag is performed by not only listing the memory page in the memory map, but also including additional information about the relevant memory page in the memory map. This can include a header, an alphanumeric code, or an additional entry in the memory map (such as a separate column in a table that corresponds to the tag). In some examples, the operating system is instructed or modified such that it recognizes the tag and avoids using any memory page tagged in this manner.

At stage 420, the first instance of the operating system can serialize the tag information. In some examples, during runtime the tag information can be stored in a memory map that includes various types of memory information, including information regarding which memory pages are currently in use. For purposes of this example method, the second instance of the operating system to be booted does not need all of the information in the memory map. So at stage 420, the first instance of the operating system can serialize the tag information by copying it from the memory map and inserting it into another data structure, such as a list, table, or bit map. The new data structure can therefore provide only the relevant information regarding bad memory pages to the new operating system instance.

At stage 425, the serialized tag information can be saved to a persistent storage location. Although the figure refers to a boot disk, which is one form of persistent storage, the tag information can be stored at any persistent storage location. The storage location can be accessible to a bootloader configured to boot a new instance of the operating system on the computing device. The persistent storage location can be accessible before initialization of the full operating system; otherwise, the operating system itself may utilize bad memory pages before becoming aware of the bad memory pages. In one example, the persistent storage location is a boot bank with boot modules. In another example, the persistent storage location is an initramfs. The boot loader of the operating system can load the boot module or initramfs such that the data is available at the time of initializing the memory subsystem.

At stage 430, the first instance of the operating system can modify or otherwise inform the device boot loader of the stored memory information. In some examples, this modification is performed at part of stage 425, such as by extending an existing boot module that the boot loader is already configured to access during the boot process. In another example, this stage comprises modifying the boot loader to access a new boot module during the boot process. In either example, the boot loader can access the serialized tag information before loading a new operating system instance.

At stage 435, the first instance of the operating system can finalize and complete its shutdown procedure, passing hardware control to the boot loader at stage 440. The boot loader can then shut down the hardware components of the computing device at stage 445 and reinitialize them at stage 450. At stage 455, the boot loader accesses the persistently stored tag information, such as by retrieving the information from a boot module or intramfs. The boot loader can then avoid using any of the memory pages that the tag information indicates have been tagged as bad.

At stage 460, the boot loader can boot the operating system, instantiating a second instance of the operating system. The boot loader can also provide the tag information to the second instance of the operating system at stage 465, such that the operating system can save the tag information to its memory map. As the second instance of the operating system continues to load at stage 470, it can reference the tag information in the memory map to avoid utilizing any memory pages that were tagged by the previous operating system instance.

Figure 5:
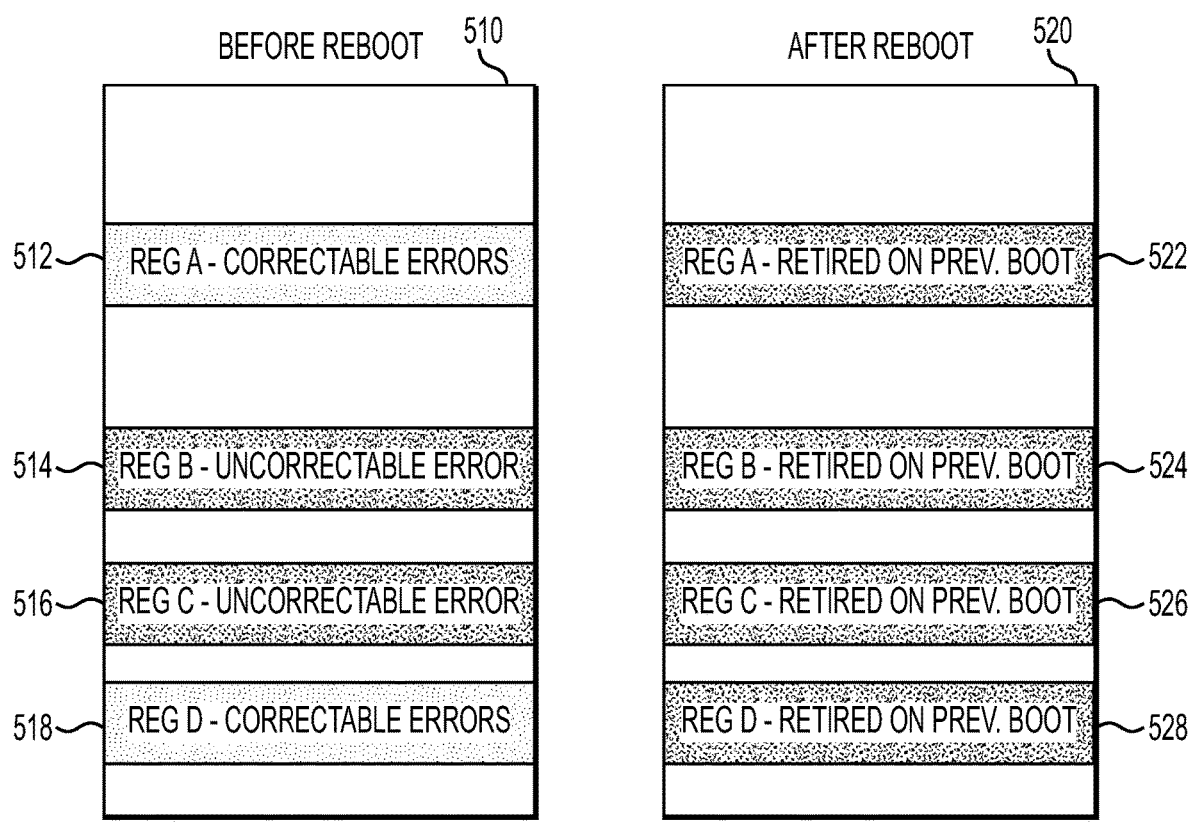
FIG. 5 is an illustration of an example memory map before and after an operating system reboot.

FIG. 5 provides an illustration of an example memory map before and after an operating system reboot. The first memory map 510 illustrates a version of a memory map before reboot, while the second memory map 520 illustrates a version of a memory map after reboot, using the methods described herein. The first memory map includes four tagged memory sections, each of which can include one or more memory pages.

In this example, memory register A 512 and memory register D 518 each correspond to one or more correctable errors. For example, multiple correctable errors in a region of memory in quick succession can cause the operating system to detect an error in that region of memory. In that example, the region of memory can be tagged as correctable errors. In an example, such a tag is considered tagging those memory pages as bad, as described in this disclosure.

Similarly, memory register B 514 and memory register C 516 each correspond to one or more uncorrectable errors. These errors may have been detected when they caused an application to crash or became corrupted when attempting to read or write data to or from the corresponding memory pages. In this example, such a tag can be considered tagging those memory pages as bad, as described in this disclosure.

After rebooting—either a hard or soft reboot, as described previously—the new instance of the operating system can maintain a new memory map 520. Rather than starting from scratch with an empty memory map, as might be required without the benefit of this invention, the new instance of the operating system can carry over tag information such that various sections of memory pages 522, 524, 526, 528 can be tagged as bad. The new instance of the operating system can then avoid using these pages.

As indicated by their sizes and positioning, each memory section 522, 524, 526, 528 of the new memory map 520 can correspond to a memory section 512, 514, 516, 518 of the old memory map 510. That is, memory section 512 in the old map 510 corresponds to memory section 522 in the new map 520, memory section 514 in the old map 510 corresponds to memory section 524 in the new map 520, memory section 516 in the old map 510 corresponds to memory section 526 in the new map 520, and memory section 518 in the old map 510 corresponds to memory section 528 in the new map 520. Rather than retain information about the memory sections being correctable or uncorrectable, the new memory map 520 can simply reflect that the memory sections were tagged as bad and, accordingly, that they should not be used by any process or application executing in the new operating system.

Figure 6:
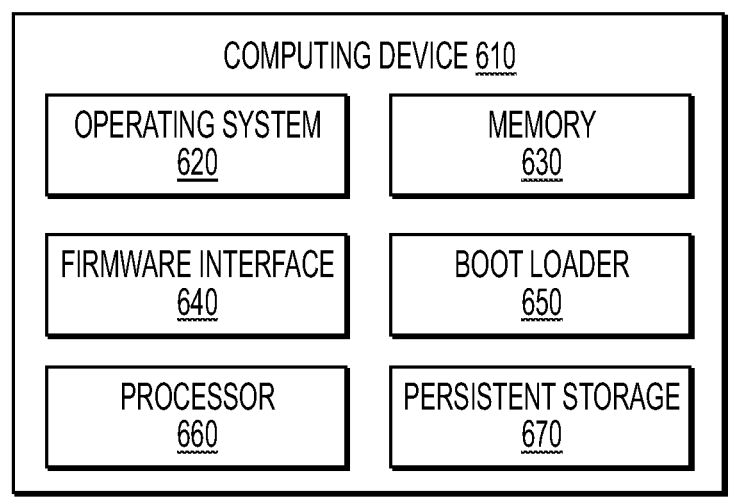
FIG. 6 is an illustration of an example system for retaining information about bad memory pages across an operating system reboot.

FIG. 6 provides an illustration of an example system for retaining information about bad memory pages across an operating system reboot. In this example, the system includes a computing device 610. The computing device 610 can be a server, computer, phone, tablet, or any other device with a hardware-based processor 660 and memory storage 630. In one example, the computing device 610 is a server that executes one or more virtual machines, either alone or in conjunction with a group of servers that combine to form a distributed network architecture.

The computing device 610 can execute one or more instances of an operating system 620, such as WINDOWS, LINUX, or MAC OS. In some examples, the computing device 610 can execute multiple instances of operating systems at the same time. In one example, the multiple instances can be different types of operating systems. The computing device 610 can also include memory storage 630 that allows for storing and retrieving information.

The computing device 610 can also include a firmware interface 640. Example firmware interfaces 640 include BIOS and UEFI. In some examples, the firmware interface 640 is provided by an original equipment manufacturer ("OEM") of the computing device 610. The firmware interface 640 can be a software program that connects the computing device 610 firmware to its operating system 620. The firmware interface 640 can include, or interface with, a boot loader 650.

The boot loader 650 can be any type of program that loads and starts the boot time tasks and processes of an operating system 620 or any other system of the computing device 610. The boot loader 650 can enable loading the operating system 620 when the computing device 610 is powered on or restarted. It can also provide or allow access to the firmware interface 640 in an example.

While the boot loader 650 can be a standalone process that is initiated upon the computing device 610 powering on from a powered off state, the operating system 620 itself can also include an integrated boot loader. For example, during a soft reboot that does not require powering down all hardware of the computing device 610, the operating system 620 can act as a boot loader by performing some of the same functions that the boot loader 650 would perform, such as instantiating a new instance of the operating system and pointing to particular memory 630 locations.

The computing device 610 can also include a hardware-based processor 660 that performs various actions for the device 610. For example, the processor 660 can carry out instructions that it receives from the operating system 620, memory 630, firmware interface 640, boot loader 650, or persistent storage 670. The processor 660 can be one or more physical chips that perform processing functions for the computing device 610.

The computing device 610 can also include a persistent storage 670 that is retained even after the computing device 610 is completely powered off. The persistent storage 670 can store the boot loader 650 and firmware interface 640, for example. It can also store tag information indicating bad memory pages or page ranges, as described above with respect to element 270 of FIG. 2 and element 425 of FIG. 4, for example. The boot loader 650 can access stored files or code within the persistent storage 670 during a boot operation, such that the retrieved information is processed before the operating system 620 is fully loaded. This can allow the computing device 610 to avoid loading the operating system 620 onto faulty memory pages, as described.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for retaining information about bad memory pages across an operating system (OS) reboot, comprising:
   detecting, by a first instance of the OS, an error in a memory page of a non-transitory storage medium of a computing device executing the OS;
   tagging, by the first instance of the OS, the memory page as a bad memory page, wherein the tag indicates that the memory page should not be used by the OS;
   extending a boot module that a boot loader is already configured to access during a boot process;
   storing in the extended boot module tag information indicating memory pages of the storage medium tagged as bad memory pages;
   receiving an instruction to reboot the OS; and
   booting a second instance of the OS according to the extended boot module.

2. The method of claim 1, wherein the instruction to reboot the OS requests a soft reboot.

3. The method of claim 1, further comprising:
   persistently storing, by the first instance of the OS, the tag information on the computing device; and
   retrieving, by the second instance of the OS, the tag information.

4. The method of claim 3, further comprising modifying the boot loader to retrieve the tag information.

5. The method of claim 1, further comprising serializing information about the bad memory page, wherein storing the tag information comprises storing the serialized information.

6. The method of claim 1, wherein the bad memory page comprises at least one of a correctable error and an uncorrectable error.

7. The method of claim 1, further comprising providing the tag information to the second instance of the OS.

8. The method of claim 1, further comprising instructing the second instance of the OS to perform a hard reboot.

9. A non-transitory, computer-readable medium containing instructions that, when executed by a hardware-based processor, performs stages for retaining information about bad memory pages across an operating system (OS) reboot, the stages comprising:
- detecting, by a first instance of the OS, an error in a memory page of a storage medium of a computing device executing the OS;
- tagging, by the first instance of the OS, the memory page as a bad memory page, wherein the tag indicates that the memory page should not be used by the OS;
- extending a boot module that a boot loader is already configured to access during a boot process;
- storing in the extended boot module tag information indicating memory pages of the storage medium tagged as bad memory pages;
- receiving an instruction to reboot the OS;
- booting a second instance of the OS; and
- providing the tag information from the extended boot module to the second instance of the OS.

10. The non-transitory, computer-readable medium of claim 9, wherein the instruction to reboot the OS requests a hard reboot, and wherein providing the tag information comprises:
- persistently storing, by the first instance of the OS, the tag information on the computing device; and
- retrieving, by the second instance of the OS, the tag information.

11. The non-transitory, computer-readable medium of claim 9, the stages further comprising instructing the second instance of the OS to not use any memory pages indicated by the tag information.

12. The non-transitory, computer-readable medium of claim 9, the stages further comprising serializing information about the bad memory page, wherein storing the tag information comprises storing the serialized information.

13. The non-transitory, computer-readable medium of claim 9, wherein the bad memory page comprises at least one of a correctable error and an uncorrectable error.

14. The non-transitory, computer-readable medium of claim 9, wherein the instruction to reboot the OS instructs the OS to perform a hard reboot.

15. A system for retaining information about bad memory pages across an operating system (OS) reboot, comprising:
- a memory storage including a non-transitory, computer-readable medium comprising instructions; and
- a computing device including a hardware-based processor that executes the instructions to carry out stages comprising:
  - detecting, by a first instance of the OS, an error in a memory page of the memory storage of the computing device;
  - tagging, by the first instance of the OS, the memory page as a bad memory page, wherein the tag indicates that the memory page should not be used by the OS;
  - extending a boot module that a boot loader is already configured to access during a boot process;
  - storing, in the extended boot module, tag information indicating memory pages of the memory storage tagged as bad memory pages;
  - receiving an instruction to reboot the OS;
  - booting a second instance of the OS; and
  - providing the tag information to the second instance of the OS from the extended boot module.

16. The system of claim 15, wherein the instruction to reboot the OS requests a hard reboot, and wherein providing the tag information comprises:
- persistently storing, by the first instance of the OS, the tag information on the computing device; and
- retrieving, by the second instance of the OS, the tag information.

17. The system of claim 16, the stages further comprising modifying the boot loader to retrieve the tag information.

18. The system of claim 15, the stages further comprising instructing the second instance of the OS to not use any memory pages indicated by the tag information.

19. The system of claim 15, the stages further comprising serializing information about the bad memory page, wherein storing the tag information comprises storing the serialized information.

20. The system of claim 15, wherein the bad memory page comprises at least one of a correctable error and an uncorrectable error.

* * * * *